United States Patent [19]

Yezrielev et al.

[11] Patent Number: 6,060,578
[45] Date of Patent: *May 9, 2000

[54] COMPOSITION WITH IMPROVED CROSSLINKING

[75] Inventors: Albert Ilya Yezrielev, Houston; Karen Kuei Kuo, Seabrook, both of Tex.

[73] Assignee: Exxon Chemical Patents Inc.

[*] Notice: This patent issued on a continued prosecution application filed under 37 CFR 1.53(d), and is subject to the twenty year patent term provisions of 35 U.S.C. 154(a)(2).

[21] Appl. No.: 08/956,512

[22] Filed: Oct. 23, 1997

Related U.S. Application Data

[60] Provisional application No. 60/029,017, Oct. 23, 1996.
[51] Int. Cl.$^7$ .................................................. C08L 67/00
[52] U.S. Cl. .......................... 528/272; 528/271; 528/289; 528/308; 525/437; 523/511
[58] Field of Search ..................... 528/272, 271, 528/289, 308; 525/437; 523/511

[56] References Cited

U.S. PATENT DOCUMENTS

| | | | |
|---|---|---|---|
| 3,473,951 | 10/1969 | Rossi et al. ............................... | 117/72 |
| 3,804,920 | 4/1974 | Cunningham et al. ................... | 260/850 |
| 3,920,595 | 11/1975 | Anderson et al. ....................... | 523/400 |
| 4,113,793 | 9/1978 | Sekmakas ............................... | 523/511 |
| 4,178,324 | 12/1979 | Chattha .................................. | 525/188 |
| 4,276,212 | 6/1981 | Khanna et al. ......................... | 524/512 |
| 4,394,486 | 7/1983 | Chattha et al. ......................... | 525/162 |
| 4,424,334 | 1/1984 | Chattha .................................. | 528/77 |
| 4,751,112 | 6/1988 | Smith, Jr. et al. ...................... | 427/388 |
| 4,859,523 | 8/1989 | Endoh et al. ........................... | 428/215 |
| 5,074,978 | 12/1991 | Debroy et al. .......................... | 204/181 |

FOREIGN PATENT DOCUMENTS

| | | |
|---|---|---|
| 257144 | 3/1988 | European Pat. Off. . |
| 432497 | 6/1991 | European Pat. Off. . |
| 520429 | 12/1992 | European Pat. Off. . |
| 49094723 | 9/1974 | Japan . |
| WO 92/03492 | 3/1992 | WIPO . |
| WO 96/18699 | 6/1996 | WIPO . |

OTHER PUBLICATIONS

*Hydroxyl Compounds,* Effect of Hydroxyl Compounds on Reactivity of Epoxy Resins, David O. Bowen and Ross C. Whiteside, Jr., Resins Research Department, The Dow Chemical Co., Freeport TX 77541; Oct. 4, 1968.

*Primary Examiner*—P. Hampton-Hightower
*Attorney, Agent, or Firm*—Douglas J. Collins

[57] ABSTRACT

A crosslinking composition including, (a) a major amount of a high molecular weight linear oligomer with at least one functional group and a number average molecular weight per functional group of at least about 1000; (b) a crosslinking agent reactive with the functional groups of the high molecular weight linear oligomer; and (c) a low molecular weight di-(poly)-functional compound having a number average molecular weight per functional group of less than about 400, the functional groups of the low molecular weight di-(poly)-functional compound also being reactive with the cross-linking agent. Crosslinking of the high molecular weight oligomer in the presence of a small amount of the low molecular weight di-(poly)-functional compound provides a crosslinked composition displaying an improved balance of hardness and flexibility.

31 Claims, No Drawings

COMPOSITION WITH IMPROVED CROSSLINKING

This application claims priority of U.S. Provision Patent Application Ser. No. 60/029,017, filed Oct. 23, 1996.

The present invention is directed to improved crosslinking compositions. More particularly, the invention is directed to compositions which crosslink via reaction of the functional groups of a functionalized oligomer and a crosslinking agent reactive with the functional groups of the oligomer.

BACKGROUND OF THE INVENTION

Crosslinking compositions are useful as binders for coatings, adhesives, and the like. When circumstances require the coating composition to display conflicting properties (e.g., a high degree of hardness and high flexibility), as is the case for compositions used as coil coatings, functional oligomers, particularly polyesters having terminal hydroxy functional groups, in combination with amino crosslinking agents were heretofore the materials of choice. To provide an optimal combination of high hardness and flexibility, the use of oligomers having relatively high molecular weights were needed. These oligomers generally had a molecular weight (number average molecular weight) greater than 2000, preferably greater than 3000, most preferably greater than 4000; or a molecular weight per functional group greater than 1000, preferably greater than 1500, most preferably greater than 2000.

Particularly good properties were realized using binders formed of phenol-functional polyesters used in combination with amino crosslinking agents. In some applications, such as the aforementioned coil coating compositions, a particularly high degree of crosslinking is required. The relatively high molecular weight linear polyester oligomers used to form these coil coating compositions do not provide a sufficiently high degree of crosslinking. To increase the degree of crosslinking, branched poly-functional polyesters were used. The branching, however, was found to reduce the flexibility of the coating.

It was therefore desirable to develop a means for increasing the crosslinking capabilities of high molecular weight linear polyester oligomers, that did not require the branching of the main polymer chain The present invention is directed to such means and further provides many additional advantages which shall become apparent as described below.

SUMMARY OF THE INVENTION

The invention is directed to the discovery that an increase in the degree of crosslinking in high molecular weight oligomers can be achieved, without the branching of the main polymer chain, by crosslinking a high molecular weight oligomer with at least one functional group and a number average molecular weight per functional group of at least about 1000, in the presence of a small but effective amount of a low molecular weight di-(poly)-functional compound having a number average molecular weight per functional group of less than about 400 and a crosslinking agent reactive with the functional groups of both the high molecular weight linear oligomer and the low molecular weight di-(poly)-functional compound.

Other and further objects, advantages and features of the present invention will be understood by reference to the following specification.

DESCRIPTION OF THE PREFERRED EMBODIMENT

Applicants have discovered that by substituting a low molecular weight compound having a high degree of functionality for a small but effective amount of the relatively high molecular weight oligomer, the degree of crosslinking in a composition containing the oligomer and a suitable crosslinking agent can be increased, without branching of the main polymer chain of the binder polymer.

Suitable oligomers include linear oligomers with terminal functional groups, preferably having a molecular weight per functional group of greater than 1000, more preferably greater than 1500, and most preferably greater than 2000. Such materials should comprise the major component of the binder; other compositions can also be present in amounts that do not affect the crosslinking capability of the binder composition. As the low molecular weight, high functionality compounds, di-(poly)-functional compounds having a molecular weight per functional group of less than 400, preferably less than 300, and most preferably less than 200 can be employed. The low molecular weight component must be reactive with the same crosslinking agent as the oligomer. The amount of the low molecular weight component can be small, as long as the amount is sufficient to effectively increase the degree of crosslinking in the composition upon reaction with a crosslinking agent. In a composition comprising the oligomer and low molecular weight component, the low molecular weight component should constitute less than 20 wt. %, preferably less than 10 wt. %, and most preferably less than 6 wt. % of the composition.

The invention is well suited for compositions containing, as the oligomer, relatively high molecular weight hydroxy-functional polyesterdiols, and preferably polyesters capped with phenol functional groups, or a combination of hydroxyl and phenol functional groups, having a molecular weight of greater than 2000, preferably greater than 3000, and more preferably greater than 4000, and amino crosslinking agents. When used in combination with this oligomer and crosslinking agent, di-(poly)-ols of low molecular weight, especially aliphatic hydroxyl-phenol and diphenol functional compounds have been found to be suitable low molecular weight additives.

Examples, demonstrating the improved crosslinking effect of the present invention using a short bake time (1.25 at 500° F. in lab oven) to a PMT of 390–400° F. for white baking enamels, are set forth below in Table 1.

TABLE 1

| | | | | | |
|---|---|---|---|---|---|
| PTE Resin (MW >4000) Wt. % | 80.0 | 77.5 | 75.0 | 72.5 | 70.0 |
| NPG Isophthalate (MW 572) Wt. % | — | 2.5 | 5.0 | 7.5 | 10.0 |
| Cymel 303, Wt. % | 20.0 | 20.0 | 20.0 | 20.0 | 20.0 |
| MEK* DR | 50 | >300 | >>300 | >>300 | >>>300 |
| Hardness Knoop | 4.5 | 6.9 | 7.5 | 9.6 | 12.2 |
| Hardness Pencil | F | 2H | 2H | 2H | 2H |
| T Bend | 0 | 0 | 0 | 1 | 1 |

*denotes methyl ethyl ketone.

While the invention has been described in terms of several specific embodiments, it is to be clearly understood that the same are susceptible to numerous changes apparent to one skilled in the art. Accordingly, the invention should not be viewed as being limited to the details shown and described above and instead, should be construed to include all changes and modifications within the spirit of the invention.

We claim:

1. A binder composition, comprising:
   (a) a high molecular weight linear oligomer with at least one functional group and a number average molecular weight per functional group of at least about 1000;

(b) a non-isocyanate crosslinking agent reactive with the functional groups of said high molecular weight linear oligomer; and (c) a low molecular weight di-(poly)-functional compound having a number average molecular weight per functional group of less than about 400, the functional groups of said low molecular weight di-(poly)-functional compound being reactive with said non-isocyanate crosslinking agent, wherein said low molecular weight di-(poly)-functional compound is present in an amount sufficient to increase the degree of crosslinking in said composition in comparison to a composition formed in the absence of said low molecular weight di-(poly)-functional compound.

2. The composition of claim 1, wherein said high molecular weight linear oligomer has terminal functional groups.

3. The composition of claim 1, wherein said high molecular weight linear oligomer has a number average molecular weight of at least 3000.

4. The composition of claim 3, wherein said number average molecular weight is at least 4000.

5. The composition of claim 1, wherein said high molecular weight linear oligomer is a hydroxy-functional polyesterdiol.

6. The composition of claim 5, wherein said high molecular weight linear oligomer is a polyester end-capped with at least one functional group selected from the group consisting of: hydroxl functional groups and phenol functional groups.

7. The composition of claim 5, wherein said crosslinking agent is an amino crosslinking agent.

8. The composition of claim 1, wherein said low molecular weight di-(poly)-functional compound has a number average molecular weight per functional group of less than 300.

9. The composition of claim 8, wherein said low molecular weight di-(poly)-functional compound has a number average molecular weight per functional group of less than 200.

10. The composition of claim 1, wherein said low molecular weight di-(poly)-functional compound is present in an amount of 20 wt. % or less.

11. The composition of claim 10, wherein said low molecular weight di-(poly)-functional compound is present in an amount of 10 wt. % or less.

12. The composition of claim 10, wherein said low molecular weight di-(poly)-functional compound is present in an amount of 6 wt. % or less.

13. The composition of claim 1, wherein said low molecular weight di-(poly)-functional compound is a di-(poly)-ol.

14. The composition of claim 13, wherein said di-(poly)-ol is selected from the group consisting of: aliphatic di-(poly)-phenol functional compounds, aliphatic di-(poly)-hydroxy functional compounds and hydroxy-phenol functional compounds.

15. A method of improving the hardness and flexibility of a crosslinking binder material which comprises the steps of: crosslinking a high molecular weight linear oligomer with at least one functional group and a number average molecular weight per functional group of at least about 1000 in the presence of a low molecular weight di-(poly)-functional compound having a number average molecular weight per functional group of less than about 400 and a non-isocyanate crosslinking agent reactive with the functional groups of said high molecular weight linear oligomer and the functional groups of said low molecular weight di-(poly)-functional compound, wherein said low molecular weight di-(poly)-functional compound is present in an amount sufficient to increase the degree of crosslinking in said composition compared to a composition formed without said low molecular weight di-(poly)-functional compound.

16. The method of claim 15, wherein said high molecular weight linear oligomer has terminal functional groups.

17. The method of claim 15, wherein said high molecular weight linear oligomer has a number average molecular weight of at least 3000.

18. The method of claim 17, wherein said number average molecular weight is at least 4000.

19. The method of claim 16, wherein said high molecular weight linear oligomer is a hydroxy-functional polyesterdiol.

20. The method of claim 19, wherein said high molecular weight linear oligomer is a polyester end-capped with functional groups selected from the group consisting of hydroxy functional groups, phenol functional groups, and a combination of a hydroxy functional group and a phenol functional group.

21. The method of claim 20, wherein said crosslinkng agent is an amino crosslinking agent.

22. The method of claim 15, wherein said low molecular weight di-(poly)-functional compound has a number average molecular weight per functional group of less than 300.

23. The method of claim 22, wherein said low molecular weight di-(poly)-functional compound has a number average molecular weight per functional group of less than 200.

24. The method of claim 15, wherein said low molecular weight di-(poly)-functional compound is present in an amount of 20 wt. % or less.

25. The method of claim 24, wherein said low molecular weight di-(poly)-functional compound is present in an amount of 10 wt. % or less.

26. The method of claim 25, wherein said low molecular weight di-(poly)-functional compound is present in an amount of 6 wt. % or less.

27. The method of claim 15, wherein said low molecular weight di-(poly)-functional compound is a di(poly)ol.

28. The method of claim 27, wherein said di-(poly)-ol is selected from the group consisting of aliphatic di-(poly)-phenol functional compounds, aliphatic di-(poly)-hydroxy functional compounds and hydroxy-phenol functional compounds.

29. A composition for producing a binder having improved hardness and flexibility, comprising:

(a) a linear, high molecular weight hydroxy-functional polyester diol, having a number average molecular weight per functional group of at least about 1000;

(b) a non-isocyanate crosslinking agent reactive therewith; and (c) a low molecular weight di-(poly)-functional compound having terminal hydroxy groups that are reactive with said non-isocyanate crosslinking agent, wherein said low molecular weight di-(poly)-functional compound has a number average molecular weight per functional group of less than about 400 and is present in an amount sufficient to increase the degree of crosslinking via the terminal hydroxy groups without branching of the polymer chain.

30. A method of improving the hardness and flexibility of a coating, comprising: crosslinking a composition for producing a binder having improved hardness and flexibility, comprising:

(a) a linear high molecular weight hydroxy-functional polyester diol, having a number average molecular weight per functional group of at least about 1000;
(b) a non-isocyanate crosslinking agent reactive therewith; and
(c) a low molecular weight di-(poly)-functional compound having terminal hydroxy groups that are reactive with said non-isocyanate crosslinking agent, wherein said low molecular weight di-(poly)-functional compound has a number average molecular weight per functional group of less than about 400 and is present in an amount sufficient to increase the degree of crosslinking via the terminal hydroxy groups without branching of the polymer chain.

31. A crosslinked coating prepared by the process of claim 15.

* * * * *